United States Patent
Muramatsu

(10) Patent No.: US 10,111,182 B2
(45) Date of Patent: Oct. 23, 2018

(54) SYSTEMS AND METHODS FOR CONTROLLING RADIO BEACON TRANSMISSIONS BASED ON A NUMBER OF DETECTIONS OF ENTRY INTO A RADIO SPACE

(71) Applicant: FUJITSU LIMITED, Kawasaki-shi, Kanagawa (JP)

(72) Inventor: Atsushi Muramatsu, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/381,746

(22) Filed: Dec. 16, 2016

(65) Prior Publication Data

US 2017/0265144 A1    Sep. 14, 2017

(30) Foreign Application Priority Data

Mar. 9, 2016 (JP) .................................. 2016-046242

(51) Int. Cl.
*H04W 52/02* (2009.01)
*H04W 52/22* (2009.01)
*H04W 52/24* (2009.01)
*H04B 17/318* (2015.01)

(52) U.S. Cl.
CPC ........ *H04W 52/228* (2013.01); *H04B 17/318* (2015.01); *H04W 52/0206* (2013.01); *H04W 52/245* (2013.01); *Y02D 70/144* (2018.01)

(58) Field of Classification Search
CPC ............. H04W 52/00; H04W 52/0225; H04W 52/0251; H04W 52/0254; H04W 52/18; H04W 88/00; H04W 88/08
USPC ........................................................ 455/522
See application file for complete search history.

(56) References Cited

U.S. PATENT DOCUMENTS

| | | | |
|---|---|---|---|
| 2005/0156031 A1* | 7/2005 | Goel | G06Q 20/201 235/383 |
| 2013/0329576 A1* | 12/2013 | Sinha | H04W 52/0229 370/252 |
| 2016/0261425 A1* | 9/2016 | Horton | G05B 15/02 |
| 2016/0345260 A1* | 11/2016 | Johnson | H04W 52/0209 |
| 2017/0134887 A1* | 5/2017 | Wegelin | H04L 67/26 |
| 2017/0192402 A1* | 7/2017 | Karp | G05B 17/02 |

FOREIGN PATENT DOCUMENTS

JP    2001-095063 A    4/2001
JP    2002-325082 A    11/2002

* cited by examiner

*Primary Examiner* — Philip Sobutka
(74) *Attorney, Agent, or Firm* — Arent Fox LLP

(57) ABSTRACT

An apparatus for radio beacon includes: a transmission circuit configured to transmit a radio beacon signal; a detection circuit configured to detect an entrance of an obstacle into a radio space of the transmission circuit; and a control circuit configured to control the transmission circuit, based on a control value corresponding to a number of times of detection which indicates the number of times the entrance of the obstacle has been detected in a given time in the detection circuit.

6 Claims, 6 Drawing Sheets

SYSTEMS AND METHODS FOR CONTROLLING RADIO BEACON TRANSMISSIONS BASED ON A NUMBER OF DETECTIONS OF ENTRY INTO A RADIO SPACE

CROSS-REFERENCE TO RELATED APPLICATION

This application is based upon and claims the benefit of priority of the prior Japanese Patent Application No. 2016-046242, filed on Mar. 9, 2016, the entire contents of which are incorporated herein by reference.

FIELD

The embodiments discussed herein are related to a radio beacon apparatus and a control method for a radio beacon apparatus.

BACKGROUND

In recent years, in a radio beacon apparatus that transmits a radio beacon signal, such as a radio beacon or the like, the power consumption of the radio beacon apparatus largely varies depending on the transmission interval and radio wave filed intensity of the radio beacon signal that is transmitted from the radio beacon apparatus. For example, when the transmission interval is increased and the radio wave field intensity is reduced, the power consumption of the radio beacon apparatus is reduced. When the transmission interval is reduced and the radio wave field intensity is increased, the power consumption of the radio beacon apparatus is increased. Also, the stability of signal arrival, such as unarrival of a radio beacon signal or the like, is largely influenced by a communication environment and the number of obstacles around the radio beacon apparatus. For example, in the communication environment in which there are many obstacles, such as people or the like, a radio wave is absorbed or scattered by the obstacles, and therefore, the stability of signal arrival of the radio beacon signal is not ensured.

Therefore, in order to ensure the stability of signal arrival of the radio beacon signal, the radio beacon apparatus is configured to set the radio wave field intensity and transmission interval of a radio beacon signal in advance and transmit the radio beacon signal, based on the radio wave field intensity and transmission interval that have been set.

As examples of the related art, Japanese Laid-open Patent Publication No. 2002-325082 is known.

SUMMARY

According to an aspect of the invention, an apparatus for radio beacon includes: a transmission circuit configured to transmit a radio beacon signal; a detection circuit configured to detect an entrance of an obstacle into a radio space of the transmission circuit; and a control circuit configured to control the transmission circuit, based on a control value corresponding to a number of times of detection which indicates the number of times the entrance of the obstacle has been detected in a given time in the detection circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since a radio wave of 300 MHz or more used for a radio beacon signal is easily absorbed by a person, it is difficult for a radio beacon device to ensure the stability of signal arrival of the radio beacon signal. Therefore, a radio beacon device is configured such that, for example, when a radio beacon signal is transmitted based on the premise that the radio beacon device is used in a communication environment in which there are many people, the radio wave field intensity of the radio beacon signal is set high and the transmission interval thereof is set short, so that the stability of signal arrival may be ensured.

However, in the radio beacon device, when the radio wave field intensity of the radio beacon signal is set high and the transmission interval thereof is set short, power consumption used for transmitting a radio beacon signal is increased. Moreover, the radio beacon device may not necessarily be in an environment in which there are many people. Therefore, a radio beacon device that may ensure the stability of signal arrival of a radio beacon signal, and at the same time, may achieve power saving is desired.

As one aspect of the present disclosure, provided are solutions for enabling to ensure the stability of signal arrival of a radio beacon signal, and at the same time, achieve power saving for a radio beacon device.

Embodiments of a radio beacon apparatus and a control method for a radio beacon apparatus disclosed herein will be described in detail below with reference to the accompanying drawings. Note that the technology disclosed herein is not limited to the specific embodiments described herein. The embodiments described below may be combined, as appropriate, to the extent that there is no contradiction.

<First Embodiment>

Figure 1:
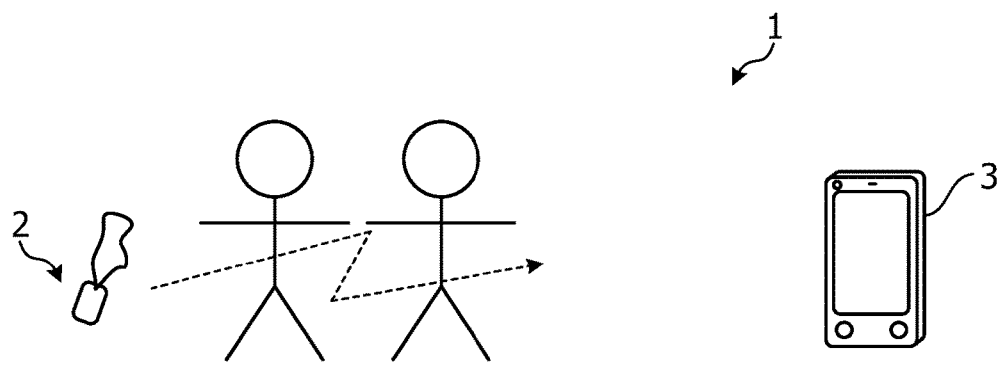
FIG. 1 is a view illustrating an example of a radio beacon system according to a first embodiment.

FIG. 1 is a view illustrating an example of a radio beacon system 1 according to a first embodiment. The radio beacon system 1 illustrated in FIG. 1 includes a radio beacon apparatus 2 and a wireless terminal 3. The radio beacon apparatus 2 regularly transmits a radio beacon signal, such as a radio beacon or the like, in a radio range of the radio beacon apparatus 2 itself. Note that a radio beacon signal herein is, for example, a signal including position information. The wireless terminal 3 receives the radio beacon signal from the radio beacon apparatus 2 in the radio range of the radio beacon apparatus 2. Then, the wireless terminal 3 receives the radio beacon signal and identifies the position information in the radio beacon signal.

Figure 2:
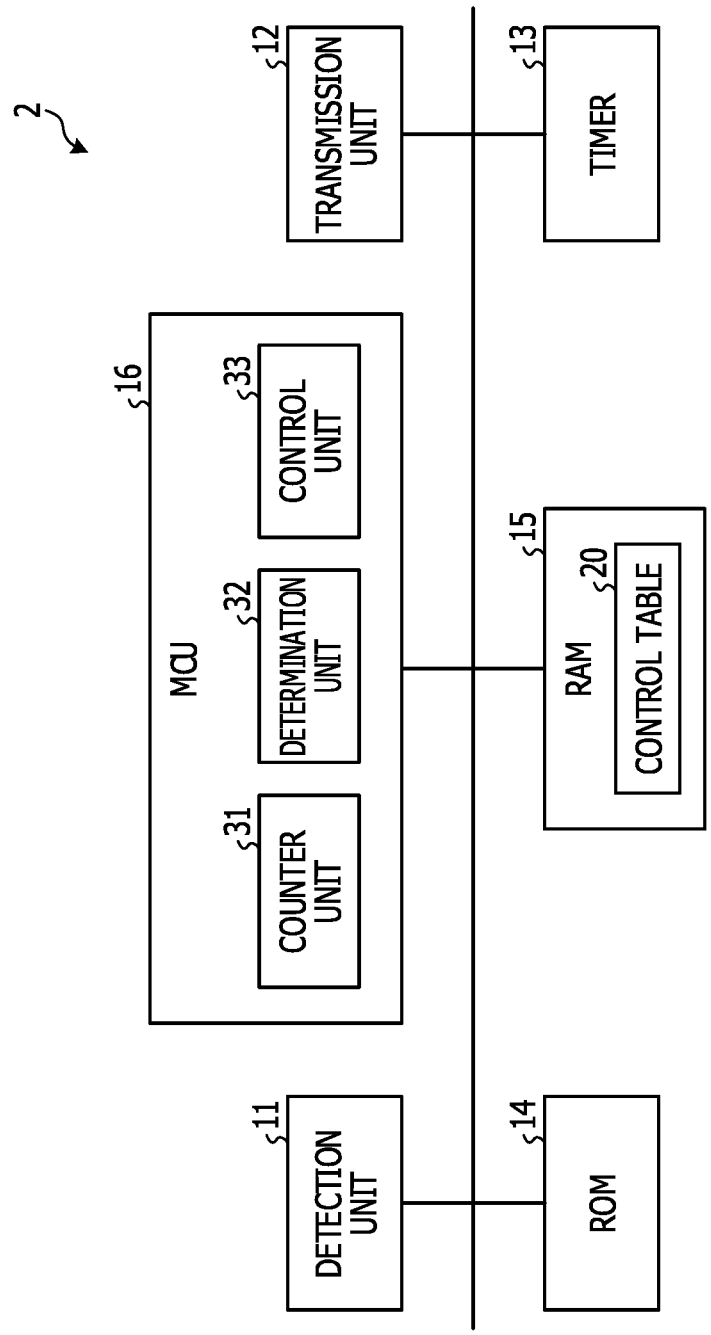
FIG. 2 is a block diagram illustrating an example of a radio beacon apparatus.

FIG. 2 is a block diagram illustrating an example of the radio beacon apparatus 2. The radio beacon apparatus 2 illustrated in FIG. 2 includes a detection unit 11, a transmission unit 12, a timer 13, read only memory (ROM) 14, random access memory (RAM) 15, and a microcontroller unit (MCU) 16. Note that the detection unit 11, the transmission unit 12, the timer 13, the ROM 14, the RAM 15, and the MCU 16 may be integrated as an LSI or the like.

Figure 3:
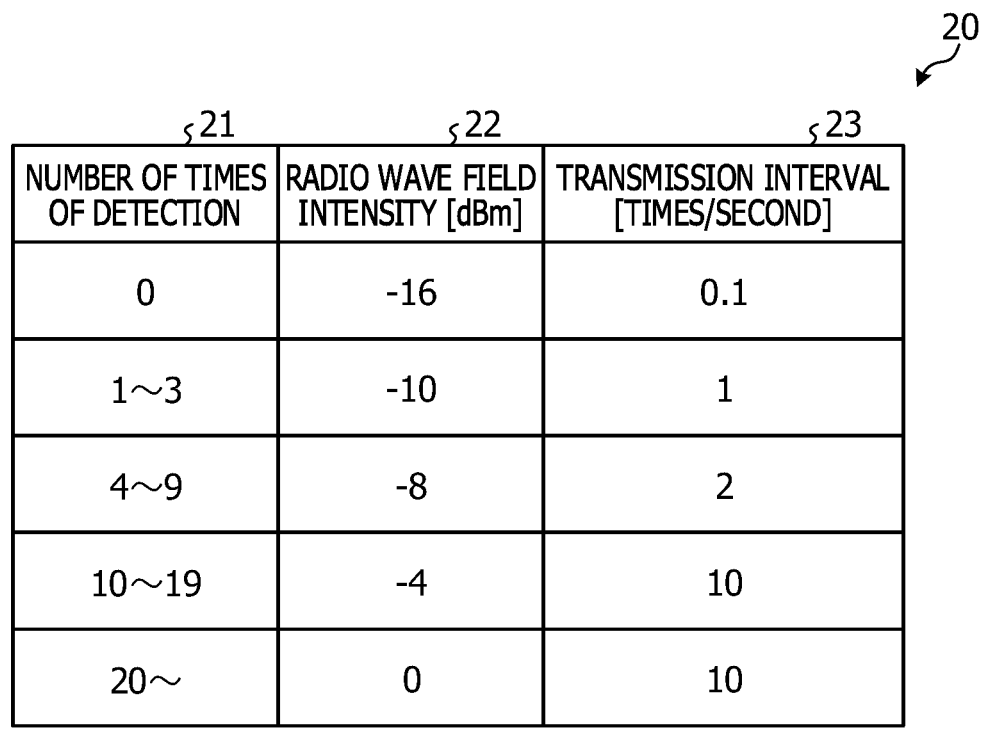
FIG. 3 is a table illustrating an example of a record configuration of a control table.

The detection unit 11 is a human sensor, such as, for example, an infrared pyroelectric sensor, a vibration sensor, or the like, which detects an entrance of an obstacle, such as a person or the like, into a radio space near the radio beacon apparatus 2. Note that the power consumption of the infrared pyroelectric sensor is about 20 µW and, when the detection unit 11 is the vibration sensor, the power consumption thereof is about 6 µW. A radio space herein is a space of the radio range of the radio beacon signal transmitted by the transmission unit 12. An obstacle herein is an interfering object, such as a person or the like, which interferes a radio beacon signal in a radio space. If the radio space of the radio beacon signal is a closed space, the detection unit 11 detects an obstacle that passes through the entrance of the radio space. The transmission unit 12 transmits the radio beacon signal, based on radio wave field intensity and a transmission interval that are currently set. The timer 13 counts a predetermined time, for example, in accordance with power supply to the radio beacon apparatus 2 or start-up of the timer 13. The ROM 14 is an area in which various types of information, such as a program or the like, are stored. The RAM 15 is a working area in which various types of information are stored and processing functions of the MCU 16 realized by various programs are executed. The RAM 15 stores a control table 20. FIG. 3 is a table illustrating an example of a record configuration of the control table 20.

The control table 20 illustrated in FIG. 3 stores radio wave field intensity 22 and a transmission interval 23 in association with each other for each number of times of detection 21. The number of times of detection 21 is the number of times an entrance of an obstacle has been detected by the detection unit 11 in a timer time. The radio wave field intensity 22 is the radio wave field intensity (dBm) of the radio beacon signal of the transmission unit 12. The transmission interval 23 is the transmission interval (times/second) of the radio beacon signal of the transmission unit 12. For example, when the number of times of detection is "0", the radio wave field intensity is "−16 dBm" and the transmission interval is "0.1 times/second". For example, when the number of times of detection is "1 to 3", the radio wave intensity is "−10 dBm" and the transmission interval is "1 time/second". For example, when the number of times of detection is "4 to 9", the radio wave intensity is "−8 dBm" and the transmission interval is "2 times/second". For example, when the number of times of detection is "10 to 19", the radio wave intensity is "−4 dBm" and the transmission interval is "10 times/second". For example, when the number of times of detection is "20 or more", the radio wave intensity is "0 dBm" and the transmission interval is "10 times/second". That is, the radio wave field intensity 22 and the transmission interval 23 are stored in the control table 20 for each number of times of detection 21 such that, as the number of times of detection increases, the radio wave field intensity increases and the transmission interval reduces. Also, the radio wave field intensity 22 and the transmission interval 23 are stored in the control table 20 for each number of times of detection 21 such that, as the number of times of detection reduces, the radio wave field intensity reduces and the transmission interval increases.

The MCU 16 controls the entire radio beacon apparatus 2. The MCU 16 develops programs that are currently stored in the ROM 14 on the RAM 15 and executes each of the various types of programs as a processing function. The MCU 16 includes, as the processing functions, a counter unit 31, a determination unit 32, a control unit 33. The counter unit 31 counts the number of times of detection of an entrance of an obstacle which indicates the number of times an entrance of an obstacle has been detected by detection unit 11. When the detection unit 11 detects a new obstacle in the radio range, the counter unit 31 increments the number of times of detection by one. Note that the number of times of detection corresponds to the number of obstacles that exist in a radio range (a radio space) of a radio beacon signal, that is, for example, the number of people who exist in the radio range. The determination unit 32 determines whether or not the time is up for the timer 13. When the time is up for the timer 13, the control unit 33 acquires the radio wave field intensity 22 and the transmission interval 23 that correspond to the number of times of detection 21 from the control table 20. Furthermore, the control unit 33 sets the radio wave field intensity 22 and the transmission interval 23 that have been acquired in the transmission unit 12. As a result, the transmission unit 12 transmits the radio beacon signal, based on the radio wave field intensity 22 and the transmission interval 23 that have been set.

Figure 4:
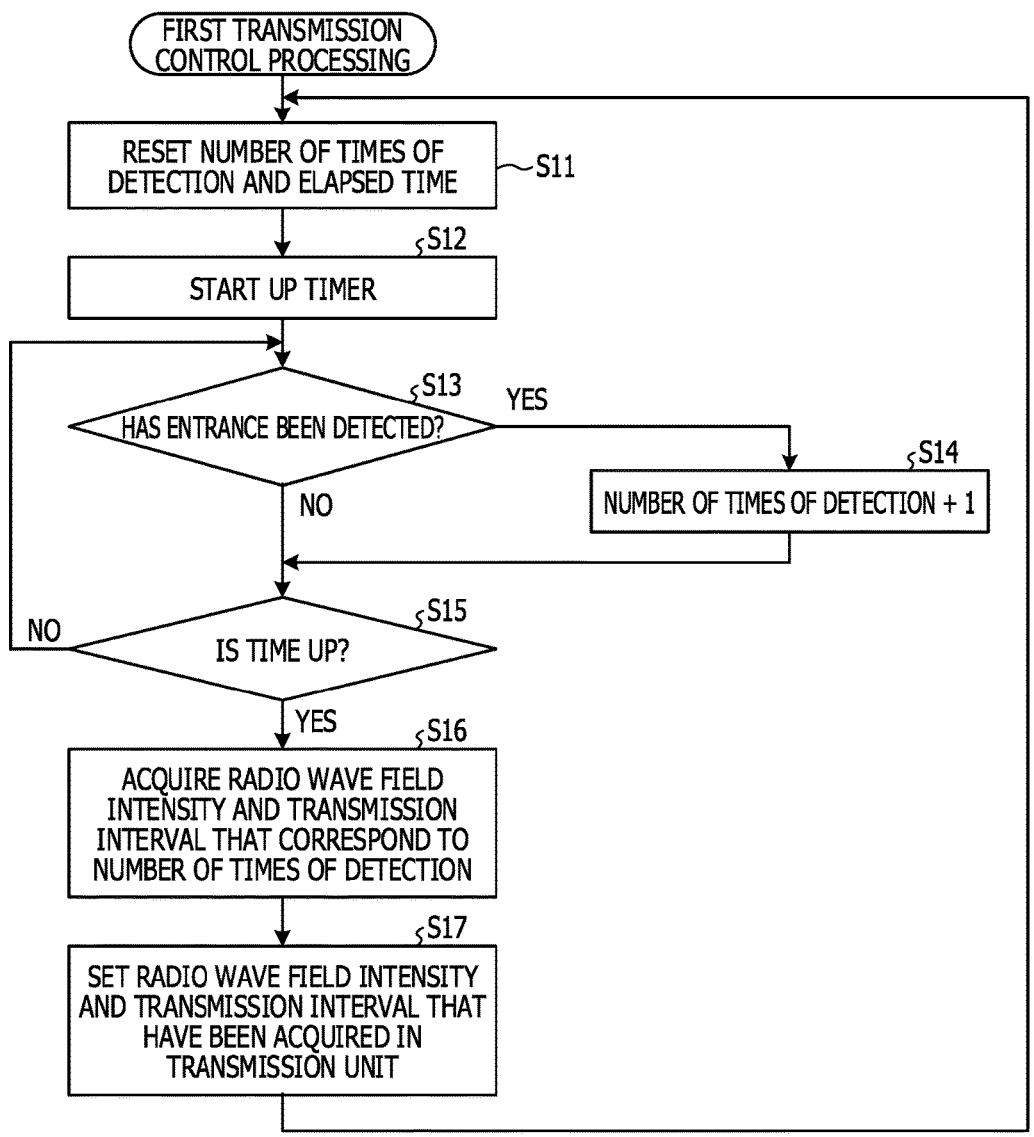
FIG. 4 is a flowchart illustrating an example of a processing operation of an MCU in the radio beacon apparatus related to first transmission control processing.

Next, an operation of the radio beacon system 1 according to the first embodiment will be described. FIG. 4 is a flowchart illustrating an example of a processing operation of the MCU 16 in the radio beacon apparatus 2 related to first transmission control processing. In FIG. 4, the control unit 33 in the MCU 16 in the radio beacon apparatus 2 resets the number of times of detection and an elapsed time that are currently stored in the RAM 15 (Step S11).

After the number of times of detection and the elapsed time of the timer 13 have been reset in Step S11, the counter unit 31 in the MCU 16 starts up the timer 13 (Step S12) and determines whether or not an entrance of an obstacle has been detected in the detection unit 11 (Step S13). If an entrance of an obstacle has been detected (YES in Step S13), the counter unit 31 increments the number of times of detection by one (Step S14). Note that the control unit 33 stores the number of times of detection that has been incremented by one in RAM 15.

After the number of times of detection has been incremented by one, the determination unit 32 in the MCU 16 determines whether or not the time is up for the timer 13 (Step S15). Note that the control unit 33 stores the elapsed time of the timer 13 in the RAM 15. If the time is up for the timer 13 (YES in Step S15), the control unit 33 acquires the radio wave field intensity 22 and the transmission interval 23 that correspond to the number of times of detection 21 from the control table 20 (Step S16).

The control unit 33 sets the radio wave field intensity 22 and the transmission interval 23 that have been acquired in the transmission unit 12 (Step S17) and, in order to reset the number of times of detection and the elapsed time, causes the process to proceed to Step S11. Note that the transmission unit 12 transmits a radio beacon signal, based on the radio wave field intensity and the transmission interval that are currently set. If the time is not up for the timer 13 (NO in Step S15), in order to determine whether or not an entrance of an obstacle has been detected in the detection unit 11, the counter unit 31 causes the process to proceed to Step S13. If an entrance of an obstacle has not been detected in detection unit 11 (NO in Step S13), in order to determined whether or not the time is up for the timer 13, the determination unit 32 causes the process to proceed to Step S15.

The MCU 16 that executes the first transmission control processing detects an entrance of an obstacle in the detection unit 11, acquires the radio wave field intensity 22 and the transmission interval 23 in accordance with the number of times of detection 21 which indicates the number of times an entrance has been detected in a predetermined time from the control table 20, and sets the radio wave field intensity and the transmission interval that have been acquired in the transmission unit 12. Then, the transmission unit 12 transmits a radio beacon signal, based n the radio wave field intensity and the transmission interval that are currently set. As a result, the radio beacon apparatus 2 may ensure the stability of arrival of the radio beacon signal reduce, and at the same time, may reduce the power consumption that is used for transmitting a radio beacon signal, so that power saving may be achieved for the radio beacon apparatus 2.

The radio beacon apparatus 2 according to the first embodiment acquires the radio wave field intensity 22 and the transmission interval 23 that correspond to the number of times of detection 21 which indicates the number of times an entrance of an obstacle has been detected in a predetermined time from the control table 20 and sets the radio wave field intensity and the transmission interval that have been acquired in the transmission unit 12. Then, the transmission unit 12 transmits a radio beacon signal, based on the radio wave field intensity and the transmission interval that are currently set. As a result, the radio beacon apparatus 2 may ensure the stability of signal arrival of the radio beacon signal and at the same time, power saving may be achieved for the power consumption that is used for transmitting a radio beacon signal.

The radio beacon apparatus 2 stores the radio wave field intensity 22 and the transmission interval 23 in the control table 20 for each number of times of detection 21 such that, as the number of times of detection increases, the radio wave field intensity increases and the transmission interval reduces. As a result, the radio beacon apparatus 2 may ensure the stability of signal arrival by causing the radio wave field intensity of the radio beacon signal to increase and the transmission interval thereof to reduce, as the number of people around the radio beacon apparatus 2 increases.

The radio beacon apparatus 2 stores the radio wave field intensity 22 and the transmission interval 23 in the control table 20 for each number of times of detection 21 such that, as the number of times of detection reduces, the radio wave field intensity reduces and the transmission interval increases. As a result, the radio beacon apparatus 2 causes the radio wave field intensity of a radio beacon signal to reduce and the transmission interval thereof to increase, as the number of people around the radio beacon apparatus 2 reduces, so that power saving may be achieved.

Note that, in accordance with power supply, the radio beacon apparatus 2 according to the above-described first embodiment causes the MCU 16 to be in operation at all times, and therefore, the power consumption thereof is large. Therefore, a radio beacon apparatus 2A configured such that, in order to further reduce the power consumption, when an entrance of an obstacle is detected in the detection unit 11, the MCU 16 is started up and, when a state in which an entrance of an obstacle has not been detected in the detection unit 11 continues for a certain time, the MCU 16 is put in a sleep state will be described below as a second embodiment.

Figure 5:
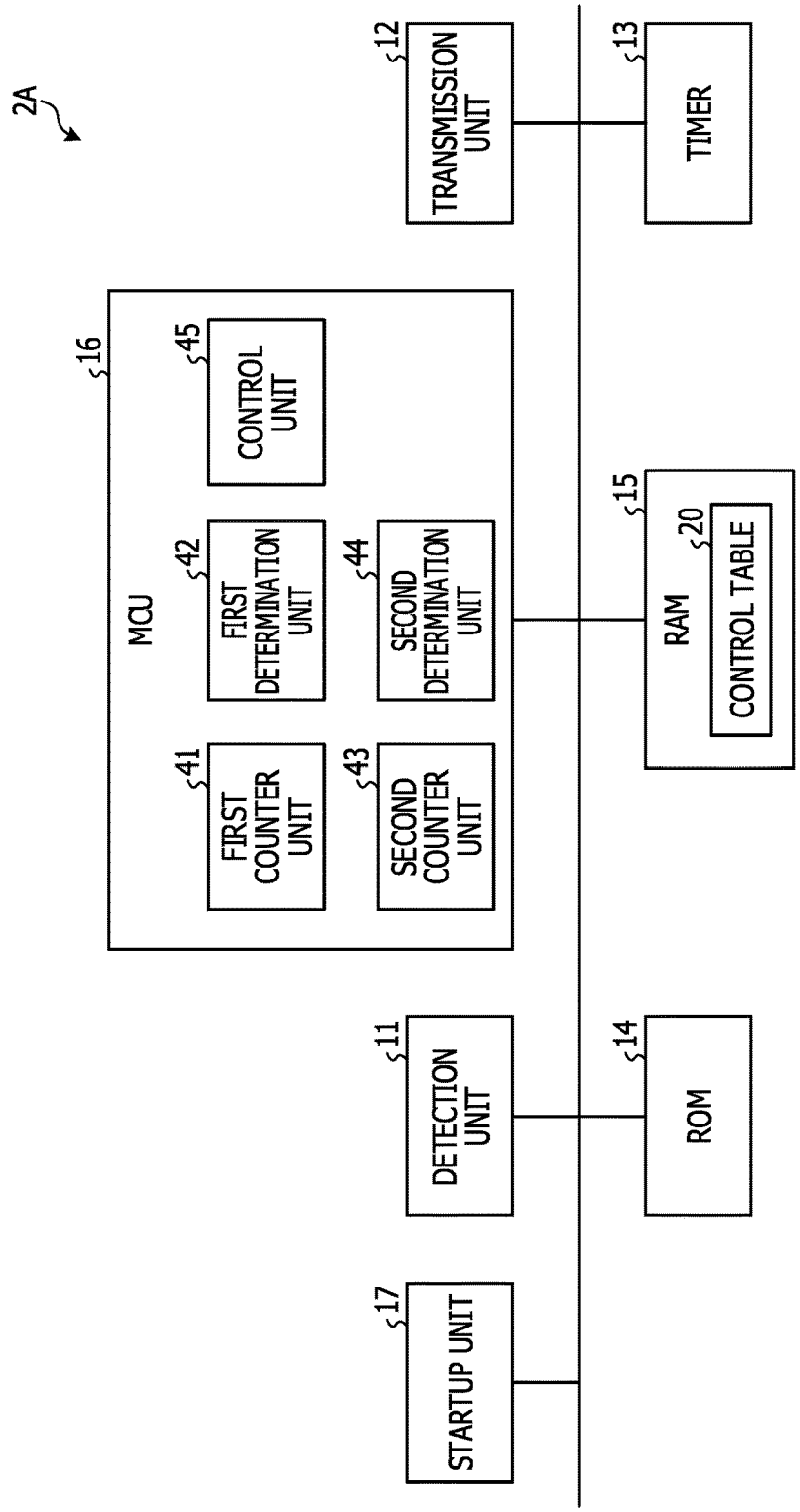
FIG. 5 is a block diagram illustrating an example of a radio beacon apparatus according to a second embodiment.

<Second Embodiment> FIG. 5 is a block diagram illustrating an example of the radio beacon apparatus 2A according to the second embodiment. Note that each part which is similar to or the same as the corresponding part of the radio beacon system 1 according to the first embodiment is denoted by the same reference character as that of the corresponding part, and the description of the overlapping part and the operation thereof will be omitted.

The radio beacon apparatus 2A illustrated in FIG. 5 includes, in addition to the detection unit 11, the transmission unit 12, the timer 13, the ROM 14, the RAM 15, and the MCU 16, a startup unit 17. The startup unit 17 starts up or stops the MCU 16. When an entrance of an obstacle is detected in the detection unit 11, the startup unit 17 starts up the MCU 16. When a state in which an entrance of an obstacle has not been detected in the detection unit 11 continues for a certain time (a first predetermined time), the startup unit 17 stops the MCU 16, that is, puts the MCU 16 in a sleep state.

The MCU 16 includes, as processing functions, a first counter unit 41, a first determination unit 42, a second counter unit 43, a second determination unit 44, and a control unit 45. The first counter unit 41 counts the number of times an entrance of an obstacle has been detected by the detection unit 11 as the number of times of detection. The first determination unit 42 determines whether or not the time is up for the timer 13. If the time is up for the timer 13, the control unit 45 acquires the radio wave field intensity 22 and the transmission interval 23 that correspond to the number of times of detection 21 from the control table 20 and sets the radio wave field intensity 22 and the transmission interval 23 that have been acquired in the transmission unit 12.

The second counter unit 43 counts the number of times of detection of no entrance which indicates the number of times no entrance of an obstacle has been detected. Note that the second counter unit 43 stores the number of times of detection of no entrance in the RAM 15. The second determination unit 44 determines whether or not the number of times of detection of no entrance exceeds a predetermined threshold and informs the startup unit 17 of a result of the determination. Note that the predetermined threshold is the certain time (the first predetermined time), that is, for example, five minutes or the like. If the startup unit 17 receives the result of the determination indicating that the number of times of detection of no entrance exceeds the predetermined threshold, the startup unit 17 puts the MCU 16 in a sleep state.

Figure 6:
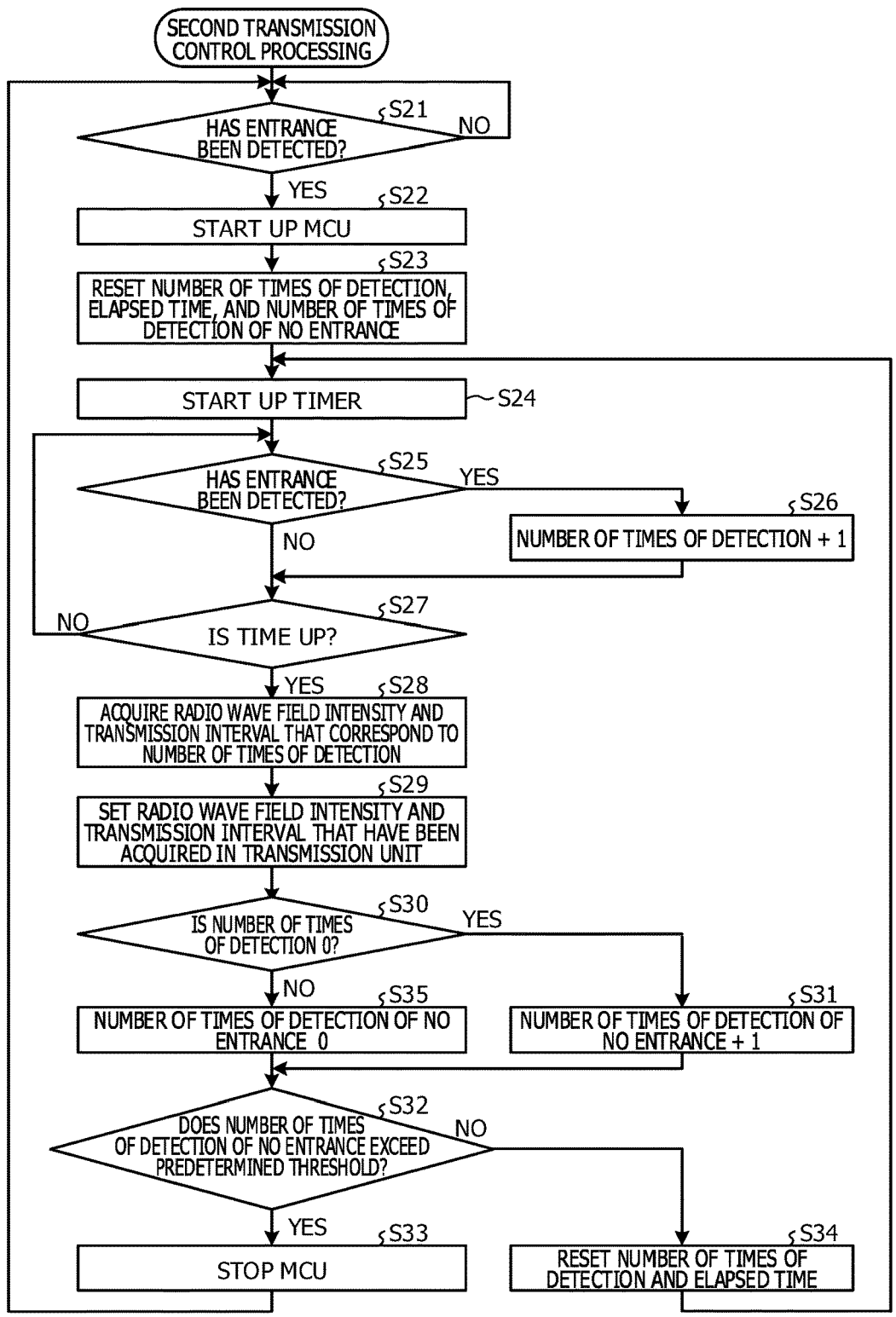
FIG. 6 is a flowchart illustrating an example of a processing operation of the radio beacon apparatus related to second transmission control processing.

Next, an operation of a radio beacon system 1 according to the second embodiment will be described. FIG. 6 is a flowchart illustrating an example of a processing operation of the radio beacon apparatus 2A related to second transmission control processing.

In FIG. 6, the startup unit 17 in the radio beacon apparatus 2A determines whether or not an entrance of an obstacle has been detected in the detection unit 11 (Step S21). If an entrance of an obstacle has been detected (YES in Step S21), the startup unit 17 starts up the MCU 16 (Step S22).

After the MCU 16 is started up, the control unit 45 in the MCU 16 resets the number of times of detection, the elapsed time, and the number of times of detection of no entrance (Step S23) and starts up the timer 13 (Step S24). The first counter unit 41 in the MCU 16 determines whether or not an entrance of an obstacle has been detected in the detection unit 11 (Step S25). If an entrance of an obstacle has been detected in the detection unit 11 (YES in Step S25), the first counter unit 41 increments the number of times of detection by one (Step S26). Then, after the number of times of detection has been incremented by one, the first determination unit 42 in the MCU 16 determines whether or not the time is up for the timer 13 that is performing counting (Step S27).

If the time is up for the timer 13 that is performing counting (YES in Step S27), the control unit 45 acquires the radio wave field intensity 22 and the transmission interval 23 that correspond to the number of times of detection 21 from the control table 20 (Step S28). The control section 45 sets the radio wave field intensity 22 and the transmission interval 23 that have been acquired in the transmission unit 12 (Step S29). Note that the transmission unit 12 transmits a radio beacon signal, based on the radio wave field intensity and the transmission interval that are currently set.

The second counter unit 43 in the MCU 16 determines whether or not the number of times of detection is "0" (Step S30). If the number of times of detection is "0" (YES in Step S30), the second counter unit 43 increments the number of times of detection of no entrance by one (Step S31). Note that the second counter unit 43 stores the number of times of detection of no entrance in the RAM 15.

After the number of times of detection of no entrance has been incremented by one, the second determination unit 44 in the MCU 16 determines whether or not the number of times of detection of no entrance exceeds the predetermined threshold (Step S32). Note that the predetermined threshold is, for example, the number of times of detection of no entrance which corresponds to the certain time, that is, for example, five minutes. If the number of times of detection of no entrance exceeds the predetermined threshold (YES in Step S32), the second determination unit 44 informs the startup unit 17 of a result of the determination. As a result, the startup unit 17 stops the MCU 16 in accordance with the result of the determination to put the MCU 16 in a sleep state (Step S33) and, in order to determine whether or not an entrance of an obstacle has been detected in the detection unit 11, causes the process to proceeds to Step S21. Note that the startup unit 17 puts the MCU 16 in a sleep state, and therefore, the power consumption of the MCU 16 may be reduced.

If the number of times of detection of no entrance does not exceed the predetermined threshold (NO in Step S32), the control unit 45 resets the number of times of detection and the elapsed time (Step S34) and, in order to start up the timer 13, causes the process to proceed to Step S24. If the number of times of detection is not "0" (NO in Step S30), the second counter unit 43 sets the number of times of detection of no entrance to "0" (Step S35) and, in order to determine whether not the number of times of detection of no entrance exceeds the predetermined threshold, causes the process to proceed to Step S32. If an entrance of an obstacle has not been detected in the detection unit 11 (NO in Step S21), in order to determine whether or not an entrance of an obstacle has been detected, the control unit 45 causes the process to proceed to Step S21.

If an entrance of an obstacle has not been detected in the detection unit 11 (NO in Step S25), in order to determine whether or not the time is up for the timer 13 that is performing counting, the first determination unit 42 causes the process to proceed to Step S27. If the time is not up for the timer 13 that is performing counting (NO in Step S27), in order to determine whether or not an entrance of an obstacle has been detected in the detection unit 11, the first determination unit 42 causes the process to proceed to Step S25.

When an entrance of an obstacle is detected while the MCU 16 is in a sleep state, the radio beacon apparatus 2A that executes the second transmission control processing illustrated in FIG. 6 starts up the MCU 16. The MCU 16 acquires the radio wave field intensity and the transmission interval that correspond to the number of times of detection of an entrance of an obstacle and sets the radio wave field intensity and the transmission interval that have been acquired in the transmission unit 12. Then, the transmission unit 12 transmits a radio beacon signal, based on the radio wave field intensity and the transmission interval that are currently set. As a result, the radio beacon apparatus 2A may ensure the stability of arrival of a radio beacon signal, and at the same time, may reduce the power consumption used for transmitting the radio beacon signal.

If the state in which the number of times of detection is "0" continues for a predetermined time, the radio beacon apparatus 2A increments the number of times of detection of no entrance by one and, if the number of times of detection of no entrance exceeds the predetermined threshold, the radio beacon apparatus 2A puts the MCU 16 in a sleep state. As a result, the radio beacon apparatus 2A is in the state in which the number of times of detection is "0", and therefore, puts the MCU 16 in a sleep state to reduce the power consumption.

When an entrance of an obstacle is detected while the MCU 16 is in a sleep state, the radio beacon apparatus 2A starts up the MCU 16. The MCU 16 acquires the radio wave field intensity and the transmission interval that correspond to the number of times of detection of an entrance of an obstacle and sets the radio wave field intensity and the transmission interval that have been acquired in the transmission unit 12. Then, the transmission unit 12 transmits a radio beacon signal, based on the radio wave field intensity and the transmission interval that are currently set. As a result, the radio beacon apparatus 2A may ensure the stability of arrival of a radio beacon signal, and at the same time, may reduce the power consumption used for transmitting the radio beacon signal.

If the state in which the number of times of detection is "0" continues for the predetermined time, the radio beacon apparatus 2A increments the number of times of detection of no entrance by one and, if the number of times of detection of no entrance exceeds the predetermined threshold, the radio beacon apparatus 2A puts the MCU 16 in a sleep state. As a result, if the state in which the number of times of detection is "0", that is, a state there is no people around the radio beacon apparatus 2A, continues for a certain time, the radio beacon apparatus 2A puts the MCU 16 in a sleep state to reduce the power consumption.

For example, in the situation in which there is no people around the radio beacon device 2A, only an operation of the detection unit 11 is performed. For example, assuming that the radio beacon apparatus 2A is installed in a store, in a situation in which an operation is not desired to be performed outside of business hours in which there is no people in the store, the power consumption may be further reduced. Note that, although the power consumption of the detection unit 11 is increased, the power consumption used for transmitting a radio beacon signal may be reduced by causing the radio wave field intensity to reduce and the transmission interval to increase, when there are only a few people, so that, as a whole, power saving may be achieved, as compared to the related art.

For example, in the radio beacon apparatus 2A employing Bluetooth (registered trademark) Low Energy, for example, when the radio wave field intensity is the highest and the transmission interval is ten times per second, the power consumption used for transmitting a radio beacon signal is about 800 μW. In contrast, when the radio wave field intensity is the lowest and the transmission interval is once per second, the power consumption used for transmitting a radio beacon signal is about 40 μW. That is, the power consumption when the radio wave field intensity is high and the transmission interval is short is about 20 times more than the power consumption when the radio wave field intensity is low and the transmission interval is long. On the other hand, the power consumption used in the detection unit 11 is about several μW, which is small enough, as compared to power used for transmitting a radio beacon signal. Therefore, when a period in which there are many people around a radio beacon signal and a period in which there are only a few people around the radio beacon signal are about the same, the same effect may be achieved with about half power consumption, by applying the present disclosure, as compared to when each of the radio wave field intensity and the transmission interval is fixed to a maximum value.

In each of the above-described embodiments, the radio wave field intensity and the transmission interval are acquired in accordance with the number of times of detection which indicates the number of times an entrance of an obstacle into a radio space has been detected in the detection unit 11, the radio wave field intensity and the transmission interval that have been acquired are set in the transmission unit 12. However, a configuration in which a leave of an obstacle from a radio space is detected and, when a leave of an obstacle is detected, the number of times of detection of an entrance of an obstacle is decremented by one, and the radio wave field intensity and the transmission interval is acquired in accordance with the number of times of detection may be employed. As a result, while checking the number of obstacles that exist in the radio space, transmission power of a radio beacon signal may be adjusted in real time.

As the detection unit 11 of each of the above-described embodiments, an infrared pyroelectric sensor or the like is described as an example, but the detection unit 11 may be a camera or the like, and a mechanism that is capable of identifying the number of obstacles that exist in a radio space may be employed. Also, the number of times of detection corresponds to the number of times of detection in the detection unit 11, but may be the number of obstacles that exist in a radio space.

The control table 20 of each of the above-described embodiments manages the radio wave field intensity and the transmission interval for each number of times of detection and, for example, the number of times of detection is managed in a range in which the number of times of detection is 4 to 9 or the like, but the radio wave field intensity and the transmission interval may be finely managed for every single number of times of detection. In this case, transmission power of a radio beacon signal may be finely adjusted for each number of times of detection.

Also, each component element of each unit illustrated in the drawings may not be physically configured as illustrated in the drawings. That is, specific embodiments of disintegration and integration of each unit are not limited to those illustrated in the drawings, and all or some of the units may be disintegrated/integrated functionally or physically in an arbitrary unit in accordance with various loads, use conditions, and the like.

Furthermore, the whole or a part of each processing function performed by each of the radio beacon apparatuses 2 and 2A may be executed on an MCU (or a microcomputer, such as a central processing unit (CPU), a micro processing unit (MPU), or the like). Also, it is needless to say that the whole or a part of each processing function may be executed on a program that is analyzed and executed by an MCU (or a microcomputer, such as a MPU, a CPU, or the like) or a hardware of a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. For example, the steps recited in any of the method or process descriptions may be executed in any order and are not limited to the order presented.

What is claimed is:

1. An apparatus for radio beacon, the apparatus comprising:
    a transmission circuit configured to transmit a radio beacon signal;
    a detection circuit configured to detect an entrance of an obstacle into a radio space of the transmission circuit;
    a control circuit configured to control the transmission circuit based on a control value corresponding to a number of times the detection circuit detects the entrance of the obstacle in a predetermined time, wherein a radio wave field intensity and a transmission interval of the beacon signal are adjusted based on the number of times the entrance of the obstacle is detected; and
    a startup circuit configured to:
        start up the control circuit when the entrance of the obstacle is detected by the detection circuit, and
        put the control unit in a sleep state when a state in which the number of times the entrance of the obstacle is detected is 0 continues for a first given time.

2. The apparatus according to claim 1, the apparatus further comprising:
    a storage circuit configured to store transmission power control information indicating the control value corresponding to the number of times the entrance of the obstacle is detected,
    wherein the control circuit is further configured to acquire the transmission power control information corresponding to the number of times the entrance of the obstacle is detected from the storage circuit and to control the transmission circuit based on the acquired transmission power control information.

3. The apparatus according to claim 2,
    wherein the storage circuit stores
    the radio wave field intensity and the transmission interval, wherein the radio wave field intensity in the transmission power control information increases and the transmission interval in the transmission power control information reduces as the number of times of detection increases, and
    wherein the radio wave field intensity in the transmission power control information reduces and the transmission interval in the transmission power control information increases as the number of times of detection reduces.

4. A method for controlling a computer which includes a transmission circuit configured to transmit a radio beacon signal, the method causing the computer to execute a process, the process comprising:
   detecting an entrance of an obstacle into a radio space of the transmission circuit;
   controlling, by a control circuit, the transmission circuit based on a control value corresponding to a number of times the entrance of the obstacle has been detected in a predetermined time, wherein a radio wave field intensity and a transmission interval of the beacon signal are adjusted based on the number of times the entrance of the obstacle is detected;
   starting up the control circuit when the entrance of the obstacle is detected; and
   putting the control unit in a sleep state when a state in which the number of times the entrance of the obstacle is detected is 0 continues for a first given time.

5. The method according to claim 4, the process further comprising:
   acquiring transmission power control information corresponding to the number of times the entrance of the obstacle is detected in the predetermined time from a storage circuit; and
   controlling the transmission circuit based on the acquired transmission power control information.

6. The method according to claim 4, the process further comprising,
   storing, in a memory, the radio wave field intensity and the transmission interval, wherein the radio wave field intensity in the transmission power control information increases and the transmission interval in the transmission power control information reduces as the number of times of detection increases, and
   wherein the radio wave field intensity in the transmission power control information reduces and the transmission interval in the transmission power control information increases as the number of times of detection reduces.

* * * * *